United States Patent [19]

St. Elmo Spence et al.

[11] Patent Number: 5,122,348

[45] Date of Patent: Jun. 16, 1992

[54] METHOD OF SLURRYING PARTIALLY CALCINED ALUMINA DUST

[75] Inventors: Winston V. St. Elmo Spence, Burlington, Canada; Peter B. Lukong, San Marino, Calif.

[73] Assignee: Alcan International Limited, Montreal, Canada

[21] Appl. No.: 639,005

[22] Filed: Jan. 9, 1991

[51] Int. Cl.⁵ ............................................. C01F 7/00
[52] U.S. Cl. ................................... 423/122; 423/629; 423/628; 423/124; 423/127; 366/2
[58] Field of Search ................ 366/2; 423/127, 111, 423/122, 124, 629, 630, 628, 625; 75/342

[56] References Cited

U.S. PATENT DOCUMENTS

| | | | |
|---|---|---|---|
| 4,051,222 | 9/1977 | Gnyra | 423/127 |
| 4,057,227 | 11/1977 | Cruff et al. | 366/2 |
| 4,568,527 | 2/1986 | Anjier et al. | 423/127 |
| 4,666,687 | 5/1987 | Chantriaux et al. | 423/127 |

Primary Examiner—Theodore Morris
Assistant Examiner—Edward Squillante
Attorney, Agent, or Firm—Cooper & Dunham

[57] ABSTRACT

A method is described for mixing a difficult to wet, finely divided powder, e.g. alumina dust, with an aqueous liquid, e.g. Bayer process spent liquor. In the method, the liquor is introduced into a cylindrical mixing zone having a conical bottom zone, the liquor being continuously introduced into the mixing zone as a high velocity stream tangentially immediately above the conical zone to thereby form a rapidly moving vortex within the mixing zone. The dust is caused to fall into the center of the vortex whereby the dust is rapidly engulfed by the liquor with little or no dusting. The thus formed slurry is continuously removed from the bottom of the conical zone and may be processed through a classification circuit, to be separated as fine seed and returned to the precipitation circuit where the fine particles are agglomerated and grown to larger particles of alumina by contact with Bayer process pregnant liquor.

5 Claims, 2 Drawing Sheets

METHOD OF SLURRYING PARTIALLY CALCINED ALUMINA DUST

BACKGROUND OF THE INVENTION

This invention relates to a method for forming a slurry from a difficult to wet, finely divided powder and an aqueous liquid and, more particularly, to the formation of a slurry of partially calcined alumina dust and Bayer process spent liquor.

In the production of alumina via the Bayer process involving calcining of the alumina trihydrate precipitated in the Bayer process, a substantial amount of alumina dust is produced. The recovery and/or elimination of this alumina dust is of major environmental and economic interest. Alumina dust in the production of alumina via the Bayer process is usually recovered by mechanical and/or electrostatic devices, such as filters, cyclone dust separators and electrostatic precipitators. The resultant recovered dust is usually partially calcined and has a very fine particle size, particularly the alumina dust recovered from the electrostatic precipitators which might have a particle size such that at least 90% by weight of the partially calcined alumina dust is smaller than about 44 microns (325 mesh), more or less.

The disposal of this dust has always been a difficult problem. Since it is very finely divided and undercalcined, it cannot be included in the normal production of calcining kilns for sale and use in smelters. It is possible to add the dust to pregnant Bayer liquors to act as fine seed and be grown to a larger useful size. It may also be added to spent liquor and processed through a classification circuit to be separated as fine seed and returned to the beginning of the precipitation circuit for further growth.

The following are examples of prior systems:

Gnyra, U.S. Pat. No. 4,051,222, describes a process to coarsen alumina dust produced in calciners for reuse in the Bayer process. This is accomplished by mixing the dust with Bayer process pregnant liquor and calcium carbonate in an aqueous medium. The produced slurry containing up to about 50 grams calcium carbonate per liter of pregnant liquor is used as seed for alumina trihydrate precipitation from pregnant Bayer process liquor.

Anjier et al, U.S. Pat. No. 4,568,527, describes a process in which alumina dust is employed as seed for the precipitation of alumina trihydrate from pregnant Bayer process liquors. For this purpose, the dust is slurried with pregnant liquor to give a concentration of solids equivalent to 2-10m²/L which at a surface area of 3.9 m²/g (Col. 5, lines 36-38), is 0.5-2.5 g/L. This slurry is fed to the beginning of the Bayer 10 process precipitation circuit.

The prior systems require that the dust be slurried in the liquor. Due to the very fine particle size of the dust and its resistance to wetting, attempts to add the dust to liquid under mechanical mixing with a stirrer have created intolerable dusting problems. Moreover the product has tended to form into large lumps, only the outside of which have been fully wetted, resulting in an impermeable outer layer surrounding a core of dust.

It is the object of the present invention to provide a method to readily form a slurry of any finely divided powder that is difficult to wet with a liquid and, particularly, to form a slurry of partially calcined alumina dust and Bayer process spent liquor.

SUMMARY OF THE INVENTION

According to the present invention in its broadest aspect, a method is provided for mixing a difficult to wet, finely divided powder with an aqueous liquid to form a slurry. The aqueous liquid is introduced into a cylindrical mixing zone having a conical bottom zone, with the liquid being continuously introduced into the mixing zone as a high velocity stream tangentially immediately above the conical zone to thereby form a rapidly moving vortex within the mixing zone. The finely divided powder is permitted to fall into the center of the vortex whereby the powder is rapidly engulfed by the liquid vortex. The slurry that is thus formed is continuously removed from the bottom of the conical zone.

The method of the invention is particularly applicable to the treatment of the very fine partially calcined alumina dust recovered from electrostatic precipitators and cyclone dust precipitators and other dust precipitating devices usually associated with a calcining apparatus for the calcining of alumina trihydrate to produce alumina. A typical dust recovered from the electrostatic precipitators has a particle size such that substantially all, i.e. at least about 90% by weight, of the alumina dust has a particle size smaller than 44 microns (325 mesh).

The method of this invention is also particularly applicable to the formation of a slurry using a Bayer spent liquor of the usual industrial composition as would result from the precipitation of alumina trihydrate. Such Bayer spent liquor is characterized by an alumina to caustic ratio of between 0.3 and 0.4, where the caustic concentration is expressed as equivalent $Na_2CO_3$ and the total caustic concentration is between 160 and 350 g/L, and the temperature from ambient to 70° C., but more usually from 50° to 60° C.

It is important in carrying out the method of the invention that a rapidly moving vortex of liquor be created. When the alumina dust is caused to fall into the center of this rapidly moving vortex, it is quickly engulfed and there is little or no dusting when the dust contacts the liquid. Also, the complete wetting of the dust particles and the formation of the slurry occurs very rapidly. Preferably the system is operated such that the concentration of suspended dust particles in the slurry is in the range of 4-15% by weight, which is equivalent to 50 to 180 g/L.

BRIEF DESCRIPTION OF THE DRAWINGS

How the object of this invention is achieved will be apparent in the light of the accompanying disclosure made with reference to the accompanying drawings in which.

DESCRIPTION OF THE PREFERRED EMBODIMENT

Figure 1:
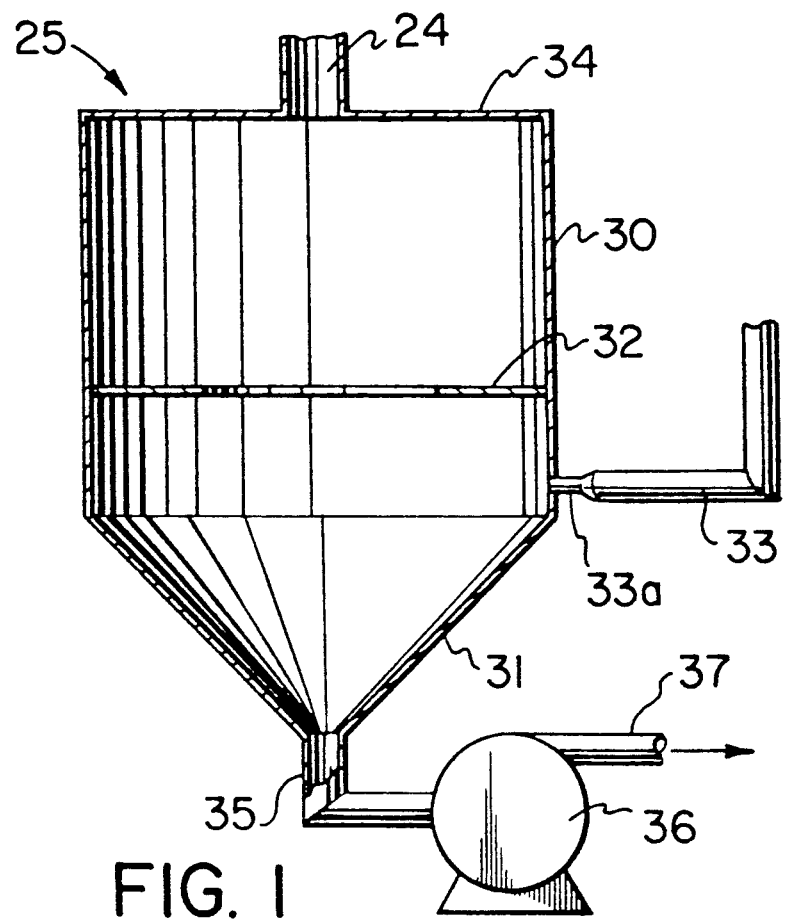
FIG. 1 is a schematic side elevation of an apparatus for carrying out the method of the invention.
Figure 2:
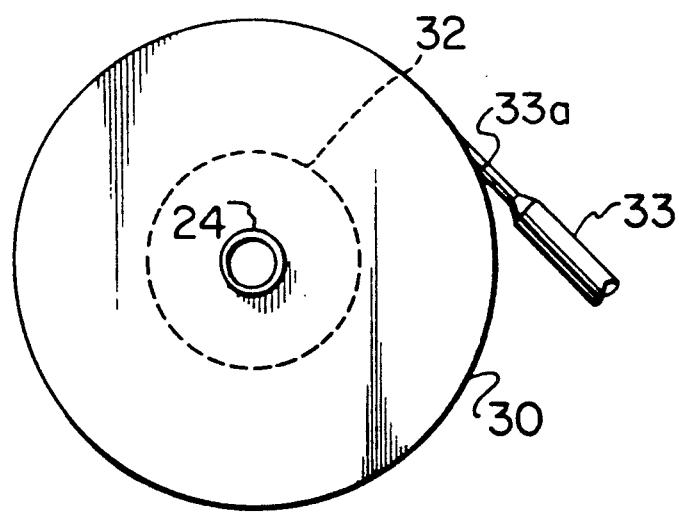
FIG. 2 is a schematic top plan view of FIG. 1.

As shown in FIGS. 1 and 2, the slurry mixer comprises a cylindrical vessel 30 with a conical bottom portion 31. An annular splash plate 32 is provided within the cylindrical vessel 30 and a tangentially positioned liquid inlet conduit 33 is provided having an inlet nozzle 33a. This nozzle is positioned immediately above the commencement of the conical portion 31.

The top of the cylindrical vessel 30 is closed by cover plate 34 in which is positioned an inlet 24 for fine dust.

A slurry discharge line 35 is positioned at the bottom of the cone 31 and this connects to a slurry centrifugal pump 36 having a discharge line 37.

Figure 3:
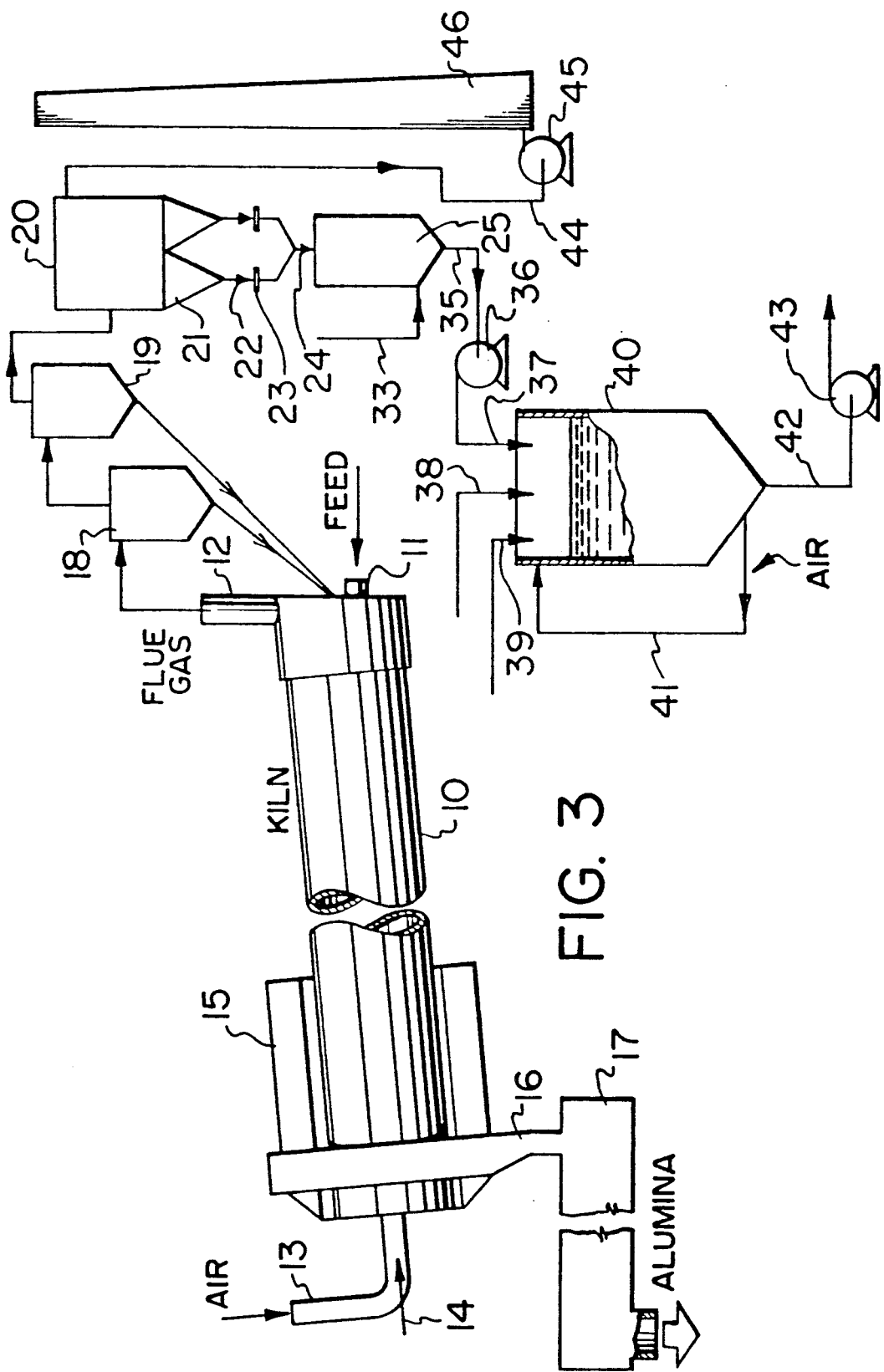
FIG. 3 is a schematic flow sheet of part of a Bayer process utilizing the method of the invention.

Looking at how the above slurry mixer is incorporated into a Bayer process, FIG. 3 shows a rotary kiln 10 for receiving feed hydrate through inlet 11. The kiln includes a flue gas riser 12, an inlet 13 for primary air, an inlet 14 for fuel oil, a unit 15 for rotating the kiln and an alumina discharge system 16. The discharged alumina passes through a fluidized cooler 17.

The flue gas discharging through riser 12 passes through a series of dust separators including uniclones 18, multiclones 19 and electrostatic precipitator 20.

Bottoms materials from the separators 18 and 19 are returned to rotory kiln 10. The dust removed in electrostatic precipitator 20 is collected in hoppers 21, while the flue gas proceeds through discharge line 44, exhaust fan 45 and stack 46. The bottom ends of the hoppers 21 connect to discharge lines 22 each containing a slide gate 23. These combine into an inlet 24 to a slurry mixer 25. Here the dust is slurried with hot spent liquor entering through tangential inlet line 33 with the formed slurry being collected through line 35 and pumped through pump 36 and discharge line 37 into a receiving vessel 40. Also being added to vessel 40 is a fine seed tank overflow 38 and a special secondary classifier overflow 39. The material in tank 40 is recycled via the recycle line 41 and the product material is discharged through discharge line 42 and centrifugal pump 43. The material discharged from pump 43 may proceed to a hydrate agitator or special secondaries.

A typical slurry mixer 25 as described above consists of a cylindrical tank 30 having a diameter of 6 feet and a height of 5 feet. The conical bottom 31 is at an angle of 45° and has a height of 3¼feet. The tangential liquor inlet 33 typically enters about 2 inches above the bottom of the cylindrical section 30 and preferably consists of a 4 inch diameter pipe 33 terminating in a 1 inch diameter nozzle 33a.

With this mixer, a liquor flow rate through the nozzle of 10 to 40 cubic feet per minute, preferably 10 to 20 cubic feet per minute, is used. This provides sufficient tangential kinetic force to create a rapidly moving vortex.

The splash plate 32 is preferably located about one third of the distance from the bottom of the cylindrical section 30 and preferably has a width equivalent to about one half the diameter of the cylindrical section.

The dust inlet is preferably a round conduit about 8 inch in diameter. The feed rate is preferably controlled by slide valve 23 or by a modified fluidized dust seal/valve. It is also possible to use a vibrator bin activator, this being a self-contained vibrating hopper bottom with a vibrating baffle for positive and continuous discharge. The slurry discharge 35 is preferably a 6 inch diameter pipe.

As will be apparent to those skilled in the light of the foregoing disclosure, many modifications, alterations and substitutions are possible in the practice of this invention without departing from the spirit or scope thereof.

We claim:

1. A method for mixing a finely divided powder with an aqueous liquid to form a slurry which comprises: (a) introducing said aqueous liquid into a cylindrical mixing zone having a conical bottom zone, said liquid being continuously introduced into the mixing zone as a high velocity stream tangential to and directly above said conical zone to thereby form a rapidly moving vortex within the mixing zone, (b) dropping said finely divided powder vertically downwardly into the center of the vortex whereby the powder is rapidly engulfed by the liquid vortex to form a slurry containing about 4-15% by weight of said finely divided powder and (c) continuously removing the formed slurry from the bottom of the conical zone.

2. A method according to claim 1 wherein the powder is partially calcined alumina dust.

3. A method according to claim 2 wherein at least 90% by weight of the particles have a size of less than about 44 microns.

4. A method according to claim 2 wherein the aqueous liquid is Bayer process spent liquor.

5. A method according to claim 1 wherein the slurry formed is processed through a classification circuit, to be separated as fine seed particles and returned to a precipitation circuit, where the fine seed particles are agglomerated and grown to larger particles of alumina by contact with Bayer process pregnant liquor.

* * * * *